United States Patent
Kim et al.

(10) Patent No.: US 9,674,281 B2
(45) Date of Patent: Jun. 6, 2017

(54) CIRCLE-MESH OVERLAY NETWORK CONSTRUCTION AND MAINTAIN METHOD

(71) Applicant: Foundation of Soongsil University-Industry Cooperation, Seoul (KR)

(72) Inventors: Young Han Kim, Seoul (KR); Le Hoanh Huu ThoP, Seoul (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 310 days.

(21) Appl. No.: 14/314,409

(22) Filed: Jun. 25, 2014

(65) Prior Publication Data

US 2014/0379877 A1    Dec. 25, 2014

(30) Foreign Application Priority Data

Jun. 25, 2013    (KR) .................. 10-2013-0072975

(51) Int. Cl.
*H04L 29/08* (2006.01)

(52) U.S. Cl.
CPC .................. *H04L 67/1042* (2013.01)

(58) Field of Classification Search
CPC .................................. H04L 67/1042
See application file for complete search history.

(56) References Cited

U.S. PATENT DOCUMENTS

| | | | |
|---|---|---|---|
| 7,529,198 B2* | 5/2009 | Jain | H04L 45/02 370/256 |
| 7,558,875 B2* | 7/2009 | Zhang | H04L 12/2602 709/238 |
| 7,984,182 B2* | 7/2011 | Suzuki | H04L 12/1886 370/236 |
| 8,484,382 B2* | 7/2013 | Das | H04L 67/104 370/254 |
| 9,240,927 B2* | 1/2016 | Das | H04L 41/12 |
| 2004/0143666 A1* | 7/2004 | Xu | H04L 29/06 709/227 |
| 2006/0077926 A1* | 4/2006 | Rune | H04L 45/34 370/328 |

(Continued)

FOREIGN PATENT DOCUMENTS

JP    EP 1926276 A1 *    5/2008    ............. H04L 29/08

OTHER PUBLICATIONS

Marcel Waldvogel and Roberto Rinaldi. 2003. Efficient topology-aware overlay network. SIGCOMM Comput. Commun. Rev. 33, 1 (Jan. 2003), 101-106. DOI=http://dx.doi.org/10.1145/774763.774779.*

*Primary Examiner* — Uzma Alam
(74) *Attorney, Agent, or Firm* — Mintz Levin Cohn Ferris Glovsky and Popeo, P.C.; Kongsik Kim; Jonathon Western

(57) ABSTRACT

A method of constructing and maintaining a circle-mesh overlay network is disclosed. The method of constructing a circle-mesh overlay network includes: (a) determining a reference member number of a circle overlay by using a total number of participating peers; (b) creating a new circle overlay and adding member peers from among the participating peers to the new circle overlay in consideration of the reference member number; and (c) forming a circle-mesh overlay network by way of interconnection between the new circle overlay and a different circle overlay.

16 Claims, 15 Drawing Sheets

(56) References Cited

U.S. PATENT DOCUMENTS

| | | | |
|---|---|---|---|
| 2007/0263587 A1* | 11/2007 | Savoor | H04L 41/5019 370/346 |
| 2009/0109898 A1* | 4/2009 | Adams | H04W 48/06 370/328 |
| 2009/0119386 A1* | 5/2009 | Busser | H04L 29/12028 709/218 |
| 2010/0281165 A1* | 11/2010 | Gerdes | H04L 67/104 709/226 |
| 2010/0317291 A1* | 12/2010 | Richardson | H04W 74/0825 455/63.1 |
| 2011/0028179 A1* | 2/2011 | Sawai | H04W 52/16 455/522 |
| 2011/0320577 A1* | 12/2011 | Bhat | H04L 45/586 709/222 |
| 2012/0213098 A1* | 8/2012 | Sun | H04W 24/08 370/252 |
| 2013/0094397 A1* | 4/2013 | Kim | H04W 40/246 370/254 |
| 2013/0166654 A1* | 6/2013 | Hjelm | H04L 67/1046 709/204 |
| 2013/0324143 A1* | 12/2013 | Yokomakura | H04L 5/0005 455/452.1 |
| 2014/0016471 A1* | 1/2014 | Maenpaa | H04L 67/104 370/235 |
| 2014/0068079 A1* | 3/2014 | Kumar | H04W 72/0453 709/226 |
| 2014/0126543 A1* | 5/2014 | Yao | H04W 36/18 370/331 |
| 2014/0189015 A1* | 7/2014 | Chan | G06Q 10/107 709/204 |
| 2014/0266778 A1* | 9/2014 | Cameron | H04Q 9/00 340/870.02 |
| 2014/0325086 A1* | 10/2014 | El-Beltagy | H04L 67/104 709/231 |
| 2015/0063368 A1* | 3/2015 | Sharma | H04L 47/18 370/412 |
| 2015/0120863 A1* | 4/2015 | Wu | H04L 12/6418 709/217 |

* cited by examiner

```
351  make_Full_Interconnection(current cirlce C, listC){
352     Remove C from listC;
353     for(C1 : listC){
354        Let's couple the members which don't have
     interconnections in C with condition that two members in the
     couple are opposite with each other in C;
355        Let's couple the members which don't have
     interconnections in C1 with condition that two members in
     the couple are opposite with each other in C1;
356        Let chosen_couple be the couple in C which has the
     smallest physcial distance d1 with a couple in C1;
357        Let chosen_C be the cirlce with which C will choose to
     make two inter-connections via chosen_couple;
358        Set C1 as chosen_C;
359        for(C2 : listC && C2 != C1){
360           Let's couple the members which don't have
     interconnections in C2 with condition that two members in
     the couple are opposite with each other in C2;
361           Let d2 be the smallest physical distance between
     chosen_couple and a couple in C2;
362           if(d2 < d1){
363              d1 = d2;
364              Set C2 as chosen_C;
365           }
366        }
367        Add inter-connections between chosen_couple in C and
     a couple in chosen_C into listInterconnections;
368        Remove chosen_C from listC;
369        Remove chosen_couple from C;
370     }
371  }
```

FIG. 5

```
make_Interconnection(current cirlce C, listC){
    Remove C from listC;
    Set listC as current_listC
    for(C1 : current_listC){
       Let chosen_member be the member in C which has the
smallest physcial distance d1 with a member in C1;
       Let chosen_C be the cirlce with which C will choose to
make one inter-connection via chosen_member;
       Set C1 as chosen_C;
       for(C2 : current_listC && C2 != C1){
          Let d2 be the smallest physical distance between
chosen_member and a member in C2;
          if(d2 < d1){
             d1 = d2;
             Set C2 as chosen_C;
          }
       }
       Add one inter-connection between chosen_member in
C and a member in chosen_C into listInterconnections;
       Remove chosen_C from current_listC;
       Remove chosen_member from C;
    }
    Let list_members be the members having the inter-
connection in C;
    for(member : list_members){
       opposite_member = member has the opposite position
with member in C;
       if( opposite_member has no interconnection){
          C1 = the circle with which member is connecting.
          member1 = the member in C1 has an inter-
connection with member in C;
          opposite_member1 = member has the opposite
position with member1 in C1;
          Add one inter-connection between
opposite_member in C and opposite_member1 in C1;
       }
    }
}
```

FIG. 9

CIRCLE-MESH OVERLAY NETWORK CONSTRUCTION AND MAINTAIN METHOD

CROSS-REFERENCE TO RELATED APPLICATIONS

This application claims priority to Korean Patent Application No. 10-2013-0072975 filed on Jun. 25, 2013, which application is incorporated herein by reference.

TECHNICAL FILED

The present invention relates to an overlay network, more particularly to a circle-mesh overlay network that forms circle-mesh overlays between peers and forms interconnections between the circle-mesh overlays.

BACKGROUND ART

In conventional client-server mechanisms, there is a widespread use of mechanisms based on P2P (peer-to-peer) processes for resolving problems of bottlenecking at the server. A P2P mechanism is a technology that allows a peer to not only receive data from another peer but also share and transmit data to other peers simultaneously, allowing the peer to function as both a server and a client.

In the case of a conventional P2P mechanism, each peer has a unique ID for a logic space, based on its position and space within an overlay, and each peer stores a routing table that includes information regarding neighboring peers and connections that should be made. By using the routing table, a peer can transfer query messages to the next peer in order to find the peer that has the information that is ultimately needed. These overlays are self-organized and self-stabilizing and are designed as major targets for sharing data.

However, the conventional P2P mechanism does not consider the scenario that a connection which contributes to a peer constructing an overlay requires a considerable amount of resources from the peer and that there is a significant time delay required for establishing a connection between two peers.

SUMMARY

An aspect of the invention is to provide a method of constructing and maintaining a circle-mesh overlay network in which there is no member peer that serves as a leader in forming the overlay, so that the burden associated with an overlay connection is not imposed on any one peer.

Also, an aspect of the invention is to provide a method of constructing and maintaining a circle-mesh overlay network in which each peer participates in the circle overlay connection, and at least two of the peers distribute the burden associated with the interconnection to another circle overlay, to minimize peers on which the burden of data relaying is imposed.

Also, an aspect of the invention is to provide a method of constructing and maintaining a circle-mesh overlay network that considers the total number of peers participating in the overlays and constructs a circle-mesh overlay network by adjusting the number of peers that can participate in each circle overlay and the total number of circle overlays, to prevent the occurrence of peers being concentrated in a particular overlay, and thereby appropriately distributing the burden associated with data relaying in each of the circle overlays.

One aspect of the invention provides a method of constructing and maintaining a circle-mesh overlay network that forms circle overlays among peers and form interconnections between the circle overlays.

An embodiment of the invention can provide a method of constructing a circle-mesh overlay network that includes: (a) determining a reference member number of a circle overlay by using a total number of participating peers; (b) creating a new circle overlay and adding member peers from among the participating peers to the new circle overlay in consideration of the reference member number; and (c) forming a circle-mesh overlay network by way of interconnection between the new circle overlay and a different circle overlay.

Another embodiment of the invention can provide a method of maintaining a circle-mesh overlay network when a new participating peer participates in the circle-mesh overlay network, where the circle-mesh overlay network can include a multiple number of circle overlays including a multiple number of member peers, and the circle overlays are interconnected with one another. The method can include: determining whether or not there exists a circle overlay having a number of members smaller than or equal to a reference member number, in correspondence to a participation request by the new participating peer; creating a new circle overlay, if a result of the determining is that there does not exist a circle overlay having a number of members smaller than or equal to a reference member number and if a number of excess members of a circle overlay having a number of members exceeding the reference member number is greater than or equal to a total number of circle overlays; adding the new participating peer to the new circle overlay and moving and adding excess member peers of the circle overlay having a number of members exceeding the reference member number to the new circle overlay; and forming interconnections between the new circle overlay and the plurality of circle overlays.

Still another embodiment of the invention can provide a method of maintaining a circle-mesh overlay network in correspondence to a departure by an arbitrary member peer, where the circle-mesh overlay network can include a multiple number of circle overlays including a multiple number of member peers, and the circle overlays are interconnected with one another. The method can include: (a) determining whether or not a number of participating member peers of a present circle overlay from which a member peer has departed is greater than or equal to a total number of circle overlays excluding the present circle overlay, if the present circle overlay is not interconnected with all other circle overlays; (b) checking a different circle overlay interconnected with the present circle overlay, if the number of participating member peers of the present circle overlay is greater than or equal to the total number of circle overlays excluding the present circle overlay; and (c) connecting any one of the member peers of the present circle overlay interconnected with the different circle overlay with a circle overlay that is not connected with the present circle overlay.

With a method of constructing and maintaining a circle-mesh overlay network according to an embodiment of the invention, there is no member peer that serves as a leader in forming the overlay, so that the burden associated with an overlay connection is not imposed on any one peer.

Also, each peer may participate in the circle overlay connection, and at least two peers may distribute the burden associated with the interconnection to another circle overlay, to minimize peers on which the burden of data relaying is imposed.

Furthermore, the total number of peers participating in the overlays is considered in adjusting the number of peers that can participate in each circle overlay and the total number of circle overlays and constructing a circle-mesh overlay network, so that the occurrence of peers being concentrated in a particular overlay may be prevented, and consequently the burden associated with data relaying in each of the circle overlays can be distributed in an appropriate manner.

Additional aspects and advantages of the present invention will be set forth in part in the description which follows, and in part will be obvious from the description, or may be learned by practice of the invention.

BRIEF DESCRIPTION OF THE DRAWINGS

FIG. 5 shows an example of program pseudo-code for the procedure for connecting a circle overlay illustrated in FIG. 3.

FIG. 9 shows an example of program pseudo-code for the procedure for forming a circle-mesh overlay by using a member peer of a circle overlay illustrated in FIG. 6.

DETAILED DESCRIPTION

Figure 1:
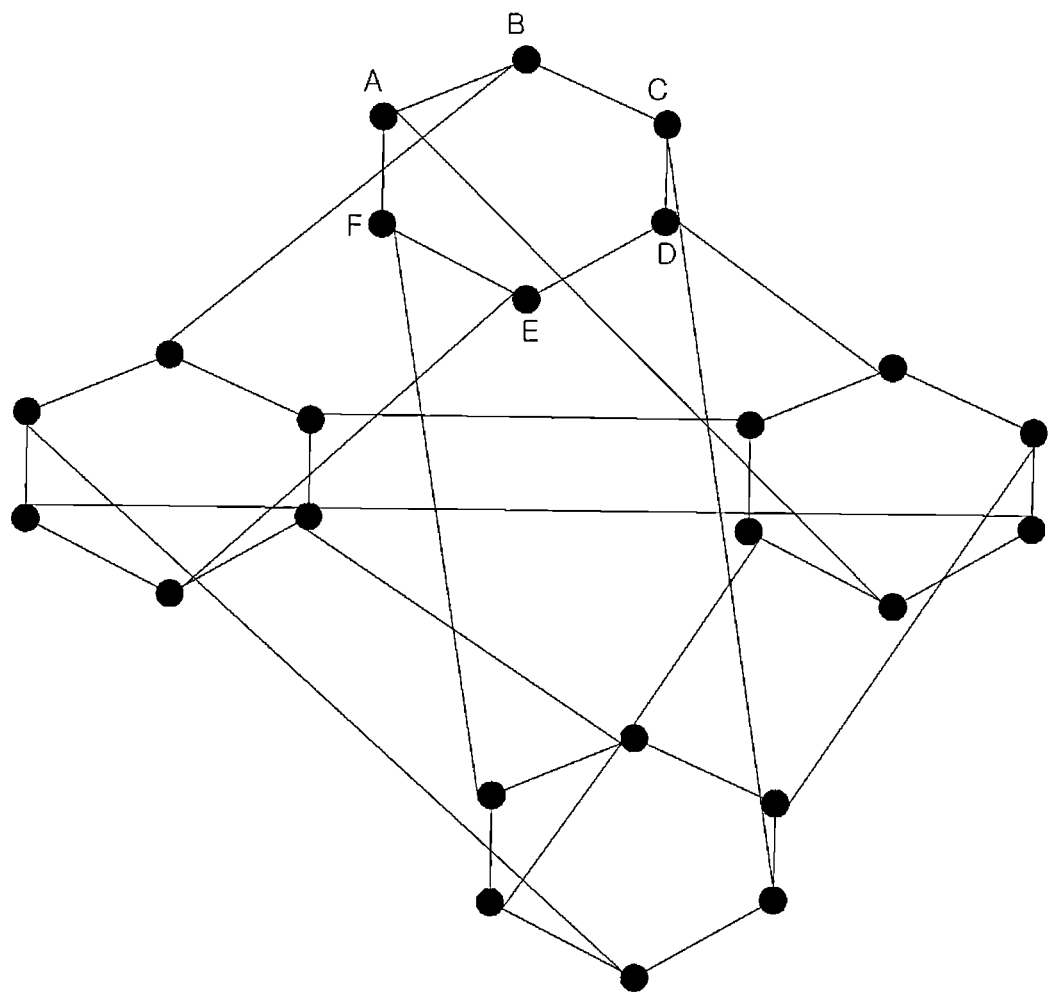
FIG. 1 is a diagram illustrating an overlay network system that manages a circle-mesh overlay network according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention relates to constructing a circle-mesh overlay network by adding the member peers in consideration of the total number of participating peers to create multiple circle overlays and interconnecting the circle overlays to overlap the overlays on a mesh base, and to maintaining the overlay network according to the newly participating and departing of peers. That is, each peer participating in a circle-mesh overlay network according to an embodiment of the invention can participate in forming a circle overlay and can participate in interconnections between circle overlays. Certain embodiments of the invention will be described below in more detail with reference to the accompanying drawings.

FIG. 1 is a diagram illustrating an overlay network system that manages a circle-mesh overlay network according to an embodiment of the invention.

Referring to FIG. 1, an overlay network system according to an embodiment of the invention may include multiple peers 110.

Each peer 110 may be a peer participating in the circle-mesh overlay network, and may form the circle-mesh overlay network by participating as a member in a circle overlay and participating in interconnections between the corresponding circle overlay and another circle overlay. Also, each peer 110 can exchange data with other peers by way of the circle-mesh overlay network thus formed.

Among the peers included in a circle overlay according to an embodiment of the invention, there is no leader peer that represents members. Also, each member peer included in a circle overlay can, while forming the circle overlay, be connected with member peers included in a different circle overlay based on the mesh that allows mutual access for communication with other circle overlays.

A method of constructing the circle-mesh overlay network is described below in more detail with reference to FIG. 2.

Although it is not explicitly shown in FIG. 1, such a circle-mesh overlay network can be formed and managed by an overlay control apparatus.

Figure 2:
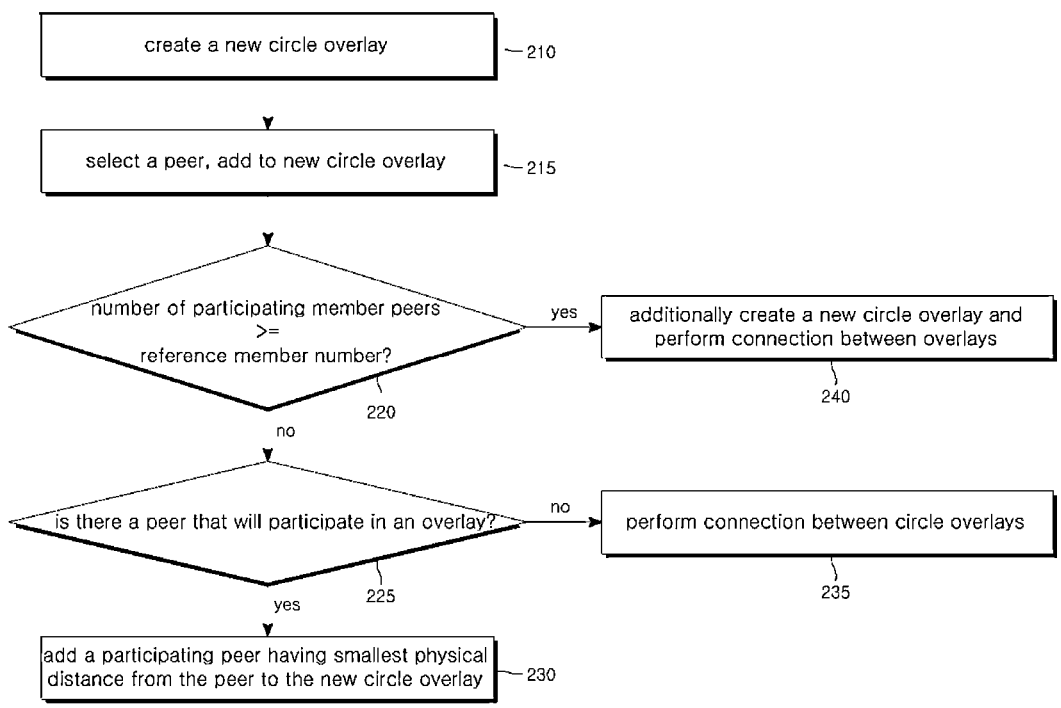
FIG. 2 is a flowchart illustrating a method of forming a circle-mesh overlay network according to an embodiment of the invention.

FIG. 2 is a flowchart illustrating a method of forming a circle-mesh overlay network according to an embodiment of the invention. In the following, the descriptions are provided based on the assumption that the entity forming the circle-mesh overlay network is an overlay control apparatus. The overlay control apparatus 200 is an apparatus that is different from the peers, which are members forming the circle-mesh overlay network.

The overlay control apparatus 200 may determine the reference member number of each circle overlay and the total number of circle overlays, in consideration of the total number of peers that wish to participate in the circle-mesh overlay network (participating peers).

In the present specification, the reference member number represents the number of members that are to be included in each circle overlay. However, the number of member peers participating (included) in each circle overlay can be smaller than the reference member number or can be greater than or equal to the reference member number.

For example, the overlay control apparatus 200 may determine the reference member number as the first even number (smallest even number) that satisfies Equation 1 shown below.

$$N \times \left(\frac{N}{2} + 1\right) \geq M \quad \text{[Equation 1]}$$

Here, N represents the reference member number, and M represents the total number of participating peers. That is, the overlay control apparatus 200 can determine the reference member number such that the member peers of one circle overlay can each participate in interconnections with all other circle overlays.

When the reference member number is determined, the overlay control apparatus 200 can determine the number of circle overlays by using the reference member number. For example, the number of circle overlays can be determined by using Equation 2 shown below.

$$\text{Number of Circle Overlays} = \frac{N}{2} + 1 \quad \text{[Equation 2]}$$

After determining the reference member number of each circle overlay and the number of circle overlays as above, the overlay control apparatus 200 can perform the procedure for constructing the circle-mesh overlay network.

In step 210, the overlay control apparatus 200 may create a new circle overlay. Then, the overlay control apparatus 200 may include the new circle overlay thus created in an overlay list. The overlay list may represent a set of circle overlays formed within the circle-mesh overlay network system.

In step 215, the overlay control apparatus 200 may add an arbitrary peer, from among the participating peers, to the new circle overlay. The overlay control apparatus 200 may store a list of peers that are to participate in the circle-mesh overlay network (referred to hereinafter as a waiting-to-participate peer list). Thus, the overlay control apparatus 200 can arbitrarily choose any one peer from among the peers included in the waiting-to-participate peer list and add it to the new circle overlay.

When an arbitrary peer is thus added to the new circle overlay, the peer may be deleted from the waiting-to-participate peer list. That is, the waiting-to-participate peer list may represent a set of peers that are not currently participating in forming the circle-mesh overlay network.

In step 220, the overlay control apparatus 200 may determine whether or not the number of member peers participating in the new circle overlay is smaller than or equal to the reference member number. That is, the overlay control apparatus 200 can form the circle overlay such that the number of peers participating in the new circle overlay does not exceed the reference member number (N).

If the number of member peers participating in the new circle overlay is smaller than or equal to the reference member number, then in step 225, the overlay control apparatus 200 may determine whether or not there exists a peer in the waiting-to-participate peer list that can participate.

If there is a peer in the waiting-to-participate peer list that can participate, then in step 230, the overlay control apparatus 200 may select, from among the peers included in the waiting-to-participate peer list, the peer that has the smallest physical distance from a member peer of the new circle overlay as a member peer and add the selected member peer to the new circle overlay.

However, if there does not exist a peer that can participate in the overlay, then the overlay control apparatus 200 may decide that the participation in the overlay has been completed for all participating peers and perform connection between the circle overlays (step 235). This process will be described later in more detail with reference to FIG. 6.

If the result of the determining of step 220 is that the number of member peers participating in the new circle overlay exceeds the reference member number, then in step 240, the overlay control apparatus 200 may decide that the adding of member to the new circle overlay created in step 210 has been completed, additionally create a new circle overlay, and repeat steps 215 to 240. Then, when the adding of members to the additionally created new circle overlay is completed, the overlay control apparatus 200 may form interconnections between the new circle overlays and other circle overlays to construct a circle-mesh overlay network. This will be described later in more detail with reference to FIG. 3.

If the result of the determining of step 225 is that there are no more peers present in the waiting-to-participate peer list, then in step 240, the overlay control apparatus 200 may perform interconnection between circle overlays in the form of a mesh. This will be described later in more detail with reference to FIG. 5.

When the procedures for constructing the circle-mesh overlay network is completed, the overlay control apparatus 200 may check whether or not there are peers waiting to participate in the waiting-to-participate peer list. If, when checking the waiting-to-participate peer list, there is a peer waiting to participate that is not participating in the circle-mesh overlay network, then the overlay control apparatus 200 may add the waiting-to-participate peer to the circle overlay that includes a peer that is closest in physical distance to the waiting-to-participate peer.

Figure 3:
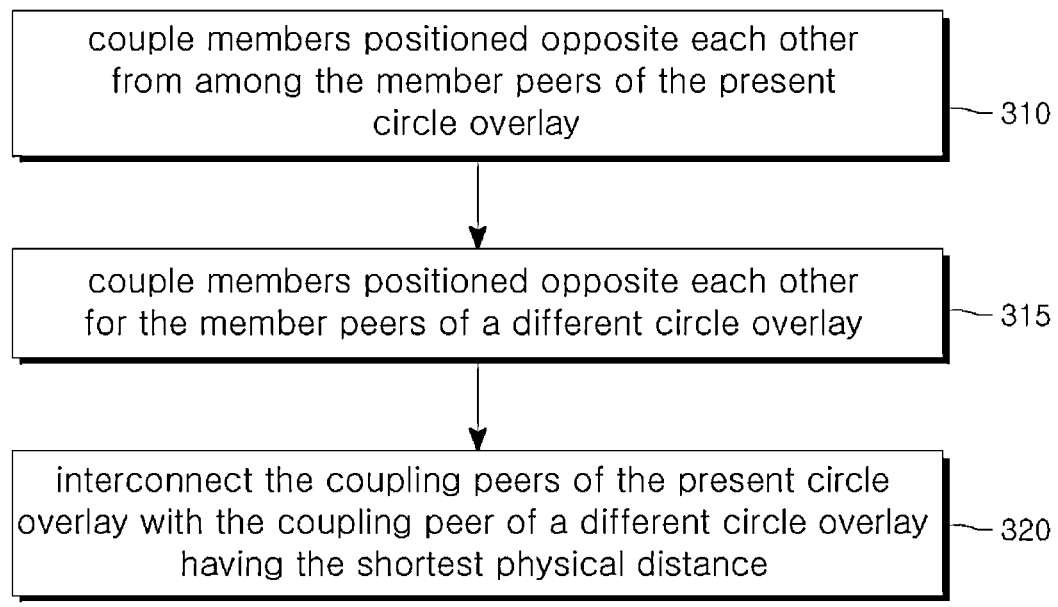
FIG. 3 is a flowchart illustrating a procedure for connecting a circle overlay according to an embodiment of the invention.
Figure 4:
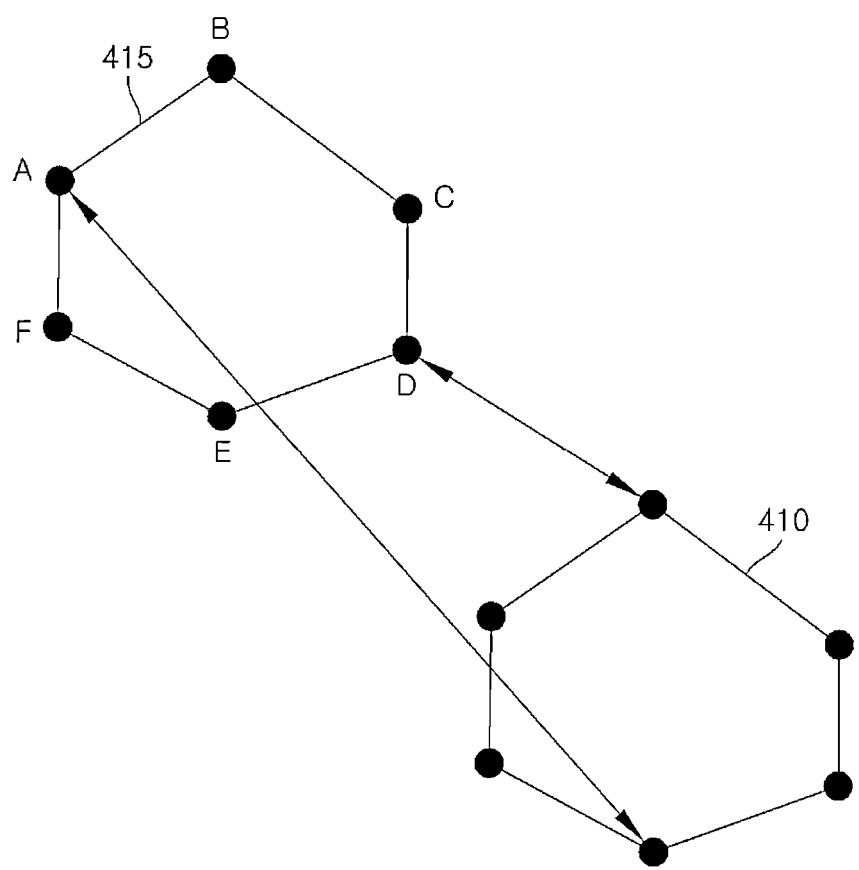
FIG. 4 is a diagram illustrating a procedure for connecting the coupled member peers between circle overlays to overlap the overlays in the form of a mesh according to an embodiment of the invention.

FIG. 3 is a flowchart illustrating a procedure for connecting a circle overlay according to an embodiment of the invention, FIG. 4 is a diagram illustrating a procedure for connecting the coupled member peers between circle overlays to overlap the overlays in the form of a mesh according to an embodiment of the invention, and FIG. 5 shows an example of program pseudo-code for the procedure for connecting a circle overlay illustrated in FIG. 3. As described below, FIG. 3 illustrates a process for connecting the present circle overlay with a different circle overlay by way of coupled member peers. That is, FIG. 3 illustrates the procedure of connecting circle overlays with a mesh base by interconnecting two member peers of a circle overlay with two member peers of another circle overlay.

In the present specification, coupled member peers refer to an arbitrary member peer participating in a circle overlay and a member peer facing the corresponding member peer. That is, reference to connecting the present circle overlay with a different circle overlay by way of coupled member peers should be interpreted as forming a mesh structure by connecting the coupled member peers of the present circle overlay with the coupled member peers of the different circle overlay to each other.

In step 310, the overlay control apparatus 200 may set the coupled member peers for the member peers participating in the present circle overlay.

For example, the overlay control apparatus 200 can set coupled member peers by setting a coupling for a member peer positioned opposite (i.e. positioned across from) a member peer participating in the present circle overlay.

Referring to FIG. 4, member peer A can be set as coupled member peers with member peer D.

In step 315, the overlay control apparatus 200 may set coupled member peers for the respective member peers of another circle overlay included in the overlay network. This may be performed by the same method of setting coupled member peers described for step 310.

When the setting of coupled member peers is completed for the member peers participating in each circle overlay, then in step 320, the overlay control apparatus 200 may interconnect the coupled member peers of the present circle overlay with the coupled member peers of a different circle overlay that is physically the closest.

For example, referring to FIG. 4, suppose there exists a different circle overlay such as 410 in the overlay network. Here, suppose a new circle overlay was created as indicated by 415.

For easier understanding and explanation, the circle overlay 410 of FIG. 4 will be referred to as a first circle overlay, while the circle overlay 415 will be referred to as a second circle overlay.

Looking at the second circle overlay, the second circle overlay includes member peer A, member peer B, member peer C, member peer D, member peer E, and member peer F as members.

In the second circle overlay, member peer A and member peer D may be set as coupled member peers that are positioned across from each other, member peer B and member peer E may be set as coupled member peers that are positioned across from each other, and member peer C and member peer F may be set as coupled member peers that are positioned across from each other.

In the same way, the peers of the first circle overlay can be set as coupled member peers.

Suppose that the circle overlay closest to the second circle overlay is the first circle overlay. It can be seen that from among the coupled member peers of the second circle overlay, the peer having the shortest physical distance from the coupled member peers of the first circle overlay is member peer D. Accordingly, the overlay control apparatus 200 can interconnect member peer D and member peer A, which is the member peer coupled with member peer D, with the coupled member peers of the first circle overlay to overlap and connect the overlays in the form of a mesh.

FIG. 5 shows program pseudo-code for the procedure of connecting circle overlays in a mesh form by interconnecting coupled member peers between circle overlays as described with reference to FIG. 3.

Figure 6:
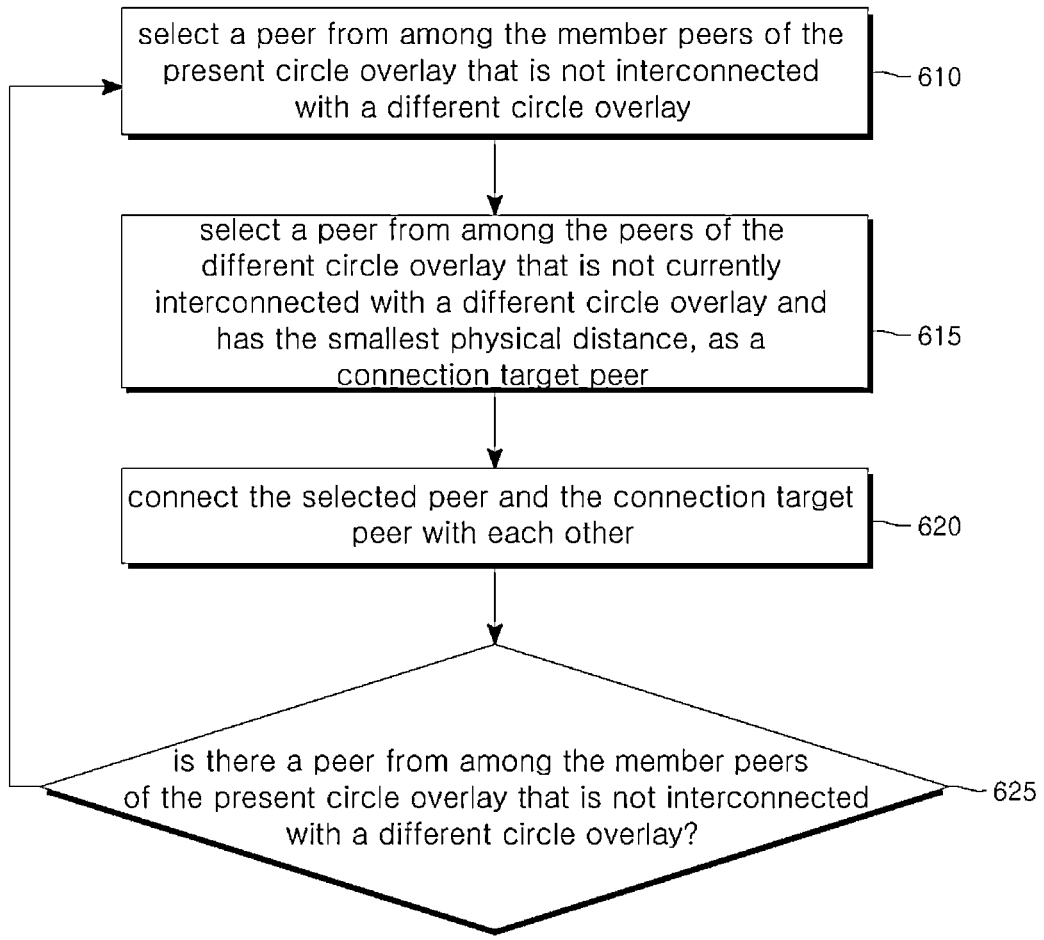
FIG. 6 is a flowchart illustrating a procedure for forming a circle-mesh overlay by using a member peer of a circle overlay according to an embodiment of the invention.
Figure 7:
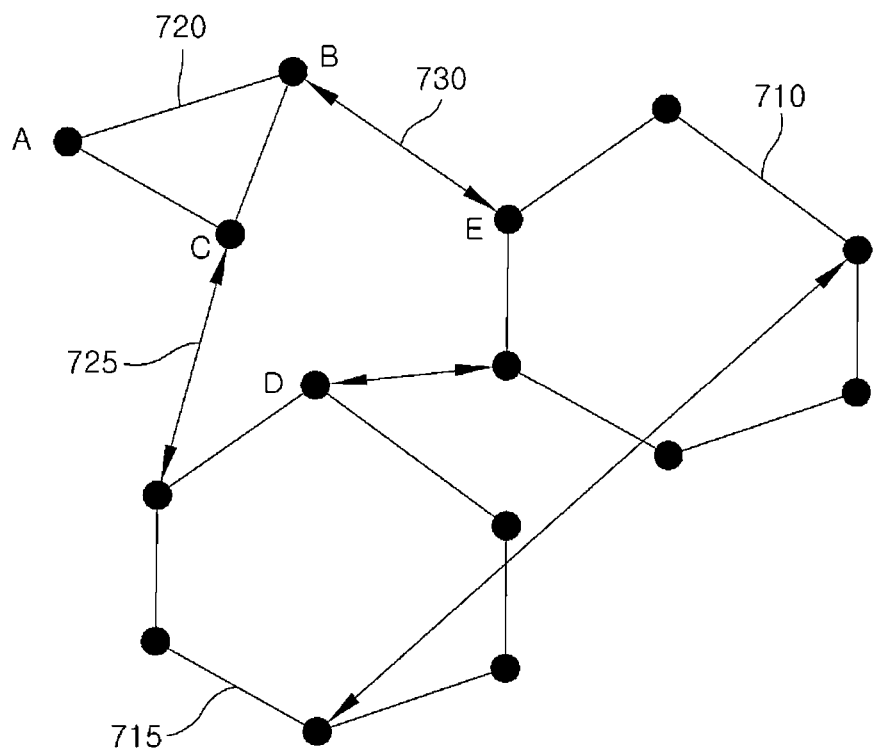
FIG. 7 and FIG. 8 are diagrams illustrating a procedure for forming a circle-mesh overlay network by using a member peer of a circle overlay according to an embodiment of the invention.
Figure 8:
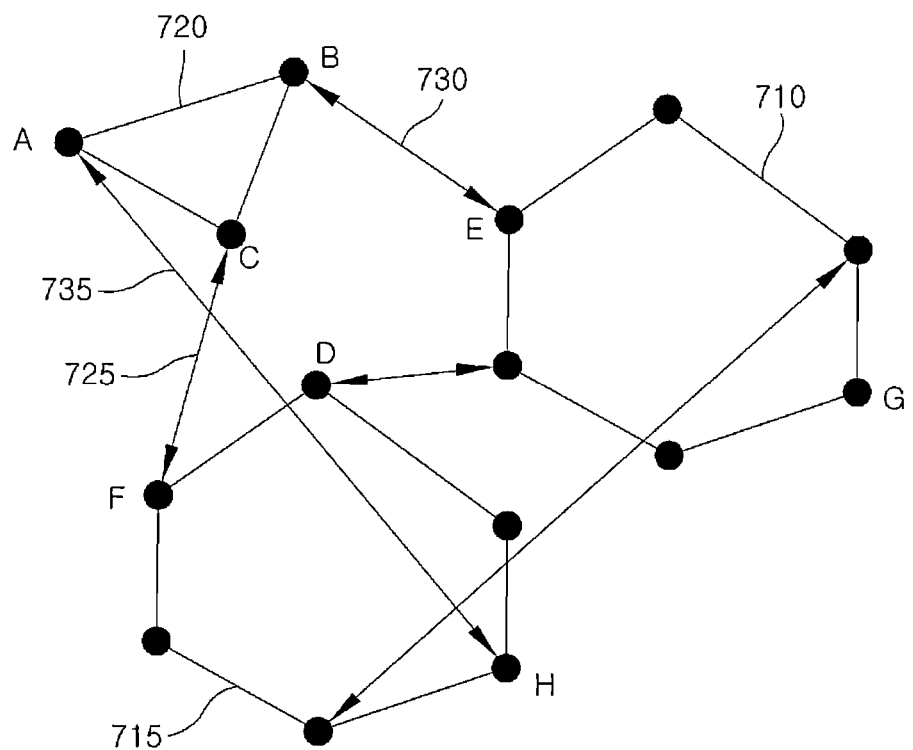

FIG. 6 is a flowchart illustrating a procedure for forming a circle-mesh overlay by using a member peer of a circle overlay according to an embodiment of the invention, FIG. 7 and FIG. 8 are diagrams illustrating a procedure for forming a circle-mesh overlay network by using a member peer of a circle overlay according to an embodiment of the invention, and FIG. 9 shows an example of program pseudo-code for the procedure for forming a circle-mesh overlay by using a member peer of a circle overlay illustrated in FIG. 6.

With reference to FIG. 6, a method is described of forming a mesh-based overlay network between a circle overlay having a number of members smaller than or equal to the circle overlay reference member number and a different circle overlay.

In step 610, the overlay control apparatus 200 may, from among the member peers of the present circle overlay that are not interconnected with another circle overlay, select the peer that has the shortest physical distance from the different circle overlay as a waiting-to-connect member peer.

In step 615, the overlay control apparatus 200 may, from among the member peers of the different circle overlay, select the member peer that is not currently participating in an interconnection with another circle overlay and has the shortest physical distance as a connection target peer.

In step 620, the overlay control apparatus 200 may connect the present circle overlay with the different circle overlay by connecting the waiting-to-connect member peer with the connection target member peer (i.e. candidate peer).

Referring to FIG. 7, suppose a first circle overlay 710 and a second circle overlay 715 are overlapped by the interconnection between coupled member peers to form an overlay network as in FIG. 7. Also, suppose that a third circle overlay has been created, as indicated by 720 of FIG. 7, that is not connected with another circle overlay. Here, it is assumed that the third circle overlay does not have enough member peers to be overlapped and connected to the other circle overlays by way of coupled members.

As illustrated in FIG. 7, suppose that the third circle overlay 720 includes member peer A, member peer B, and member peer C as its members.

Supposing that the member peer that is physically the closest to the other circle overlays, from among the member peers of the third circle overlay 720, is member peer C, the overlay control apparatus 200 can select member peer C of the third circle overlay 720 as a waiting-to-connect member peer. Then, the overlay control apparatus 200 can select the second circle overlay's member peer F, which is physically the nearest to the waiting-to-connect member peer of the third circle overlay 720 and which is not participating in an interconnection with another circle overlay, as a candidate peer. The overlay control apparatus 200 can connect the waiting-to-connect member peer (i.e. member peer C) with the candidate peer (member peer F) to form a connection between the second circle overlay and the third circle overlay.

Then, the overlay control apparatus 200 may determine whether or not there is a member peer for which an interconnection with another circle overlay has not been created, from among the member peers of the present circle overlay, and if there is, may repeat the procedure for creating an interconnection with another circle overlay.

The overlay control apparatus 200 can overlap overlays by creating an interconnection 730 between member peer B of the third circle overlay and member peer E of the first circle overlay.

In this way, the overlay control apparatus 200 may form a single connection between the third circle overlay and a different circle overlay.

Even after forming a single connection as above, if there exists a member peer that is not connected with another circle overlay, from among the member peers of the third circle overlay, then the overlay control apparatus 200 may create a second interconnection between the third circle overlay and a different circle overlay. That is, referring to FIG. 8, even after creating single connections between the third circle overlay 720 and the first circle overlay 710 and second circle overlay 715, it can be seen that member peer A from among the member peers of the third circle overlay 720 is not overlapped with another circle overlay. Accordingly, the overlay control apparatus 200 may connect member peer A with member peer H, which has the smallest physical distance from among the member peers that are positioned across from member peer F and member peer E interconnected with member peer B and member peer C (e.g. member peer H and member peer G), to create a second interconnection 735.

In step 625, the overlay control apparatus 200 may determine whether or not there exists a member peer that is not connected with a member peer of a different circle overlay, from among the member peers of the present circle overlay.

If there is a member peer that is not connected with a member peer of another circle overlay, then steps 610 to 620 may be repeated.

FIG. 9 shows an example of program pseudo-code for a method of forming an overlay network by overlapping a circle overlay that has a number of member peers smaller than the circle overlay reference member number with another circle overlay with a mesh base.

Figure 10:
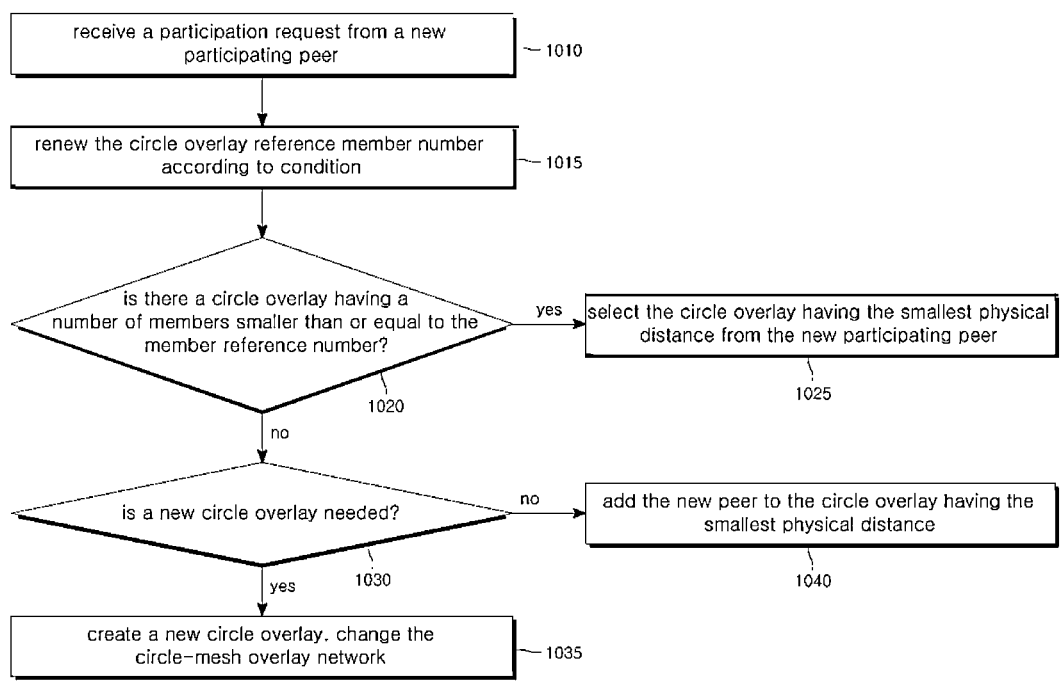
FIG. 10 is a flowchart illustrating a procedure for connecting to the circle-mesh overlay network when a new peer participates according to an embodiment of the invention.

FIG. 10 is a flowchart illustrating a procedure for connecting to the circle-mesh overlay network when a new peer participates according to an embodiment of the invention.

In step 1010, the overlay control apparatus 200 may receive a participation request from a new peer.

Then, in step 1015, the overlay control apparatus 200 may renew the circle overlay reference member number if a condition is satisfied.

For example, the overlay control apparatus 200 can renew the circle overlay reference member number if the condition of Equation 3 below is satisfied.

$$\left(\left(\frac{N}{2}\right)+1\right)\times N < (M+1)$$ [Equation 3]

Here, N represents the reference member number of the circle overlay, and M represents the total number of peers participating in the circle-mesh overlay network.

In step 1020, the overlay control apparatus 200 may determine whether or not there exists a circle overlay that includes a number of member peers smaller than or equal to the reference member number, from among all of the circle overlays.

If there is a circle overlay of which the member peers are of a number smaller than or equal to the reference member number, then in step 1025, the overlay control apparatus 200 may add the new peer to the circle overlay that includes a number of member peers smaller than or equal to the reference member number.

To be more specific, the overlay control apparatus 200 can add the new peer to a circle overlay by connecting the new peer with member peers that have the nearest physical distances from the new peer, from among member peers of a circle overlay that have a number of member peers smaller than or equal to the reference member number.

The method by which the overlay control apparatus 200 determines the position of the new peer will be described later in more detail with reference to FIG. 11.

Also, if there are more than one circle overlays that include member peers of a number smaller than or equal to the reference member number, then the overlay control apparatus 200 can select the circle overlay of which the physical distance is the nearest from the new peer and add the new peer to the selected circle overlay.

However, if there are no circle overlays that include a number of member peers smaller than or equal to the reference member number, then in step 1030, the overlay control apparatus 200 may determine whether or not it is needed to create a new circle overlay.

For example, the overlay control apparatus 200 can decide that a newly created overlay could be overlapped by interconnection with other circle overlays if the number of excess members of a circle overlay exceeding the reference member number is greater than or equal to the total number of circle overlays, in which case the overlay control apparatus 200 can create a new circle overlay.

If it is needed to create a new circle overlay, then in step 1035, the overlay control apparatus 200 may create a new circle overlay and change the circle-mesh overlay network.

The method of changing the circle-mesh overlay network due to the addition of a new circle overlay will be described later in more detail with reference to FIG. 12.

However, if it is not needed to create a new circle overlay, then in step 1040, the overlay control apparatus 200 may select the circle overlay having the smallest physical distance from the new participating peer and add the new participating peer to the selected overlay. The method of determining the position of the new participating peer in the corresponding circle overlay will be described later in more detail with reference to FIG. 11.

Figure 11:
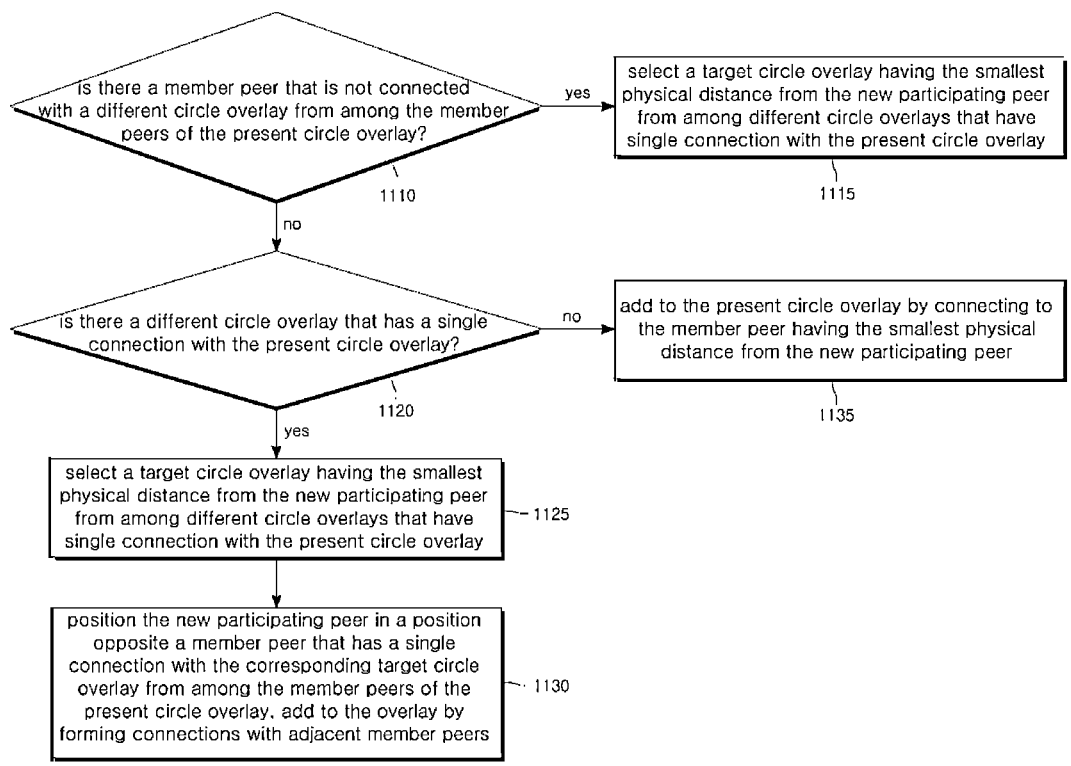
FIG. 11 is a flowchart illustrating a method of determining the position of a new participating peer in the circle-mesh overlay network according to an embodiment of the invention.

FIG. 11 is a flowchart illustrating a method of determining the position of a new participating peer in the circle-mesh overlay network according to an embodiment of the invention.

In step 1110, the overlay control apparatus 200 may determine whether or not there exists a member peer that is not connected with a different circle overlay, from among the member peers of a selected circle overlay (referred to for convenience as the present overlay).

If there is a member peer that is not connected with a different circle overlay, then in step 1115, the overlay control apparatus 200 may add the new participating peer by positioning the new participating peer opposite (across from) the member peer that is not connected with a different circle overlay and forming connections with adjacent member peers.

However, if there is no member peer that is not connected with a different circle overlay, then in step 1120, the overlay control apparatus 200 may determine whether or not there exists another circle overlay that has a single connection formed with the present circle overlay.

If there is a different circle overlay with which the present circle overlay has a single connection, then in step 1125, the overlay control apparatus 200 may select the circle overlay of which the physical distance from the new participating peer is the smallest, from among the different circle overlays with which the present circle overlay has single connections formed, as a target circle overlay.

Then, in step 1130, the overlay control apparatus 200 may position the new participating peer in a position opposite the member peer that has a single connection with the corresponding target circle overlay, from among the member peers of the present circle overlay, and may add form connections with the adjacent member peers to add the new participating peer to the overlay.

However, if there is no other circle overlay with which a single connection is formed with the present circle overlay, then in step 1135, the overlay control apparatus 200 may add the new participating peer by connecting the new participating peer with the member peer having the smallest physical distance.

Figure 12:
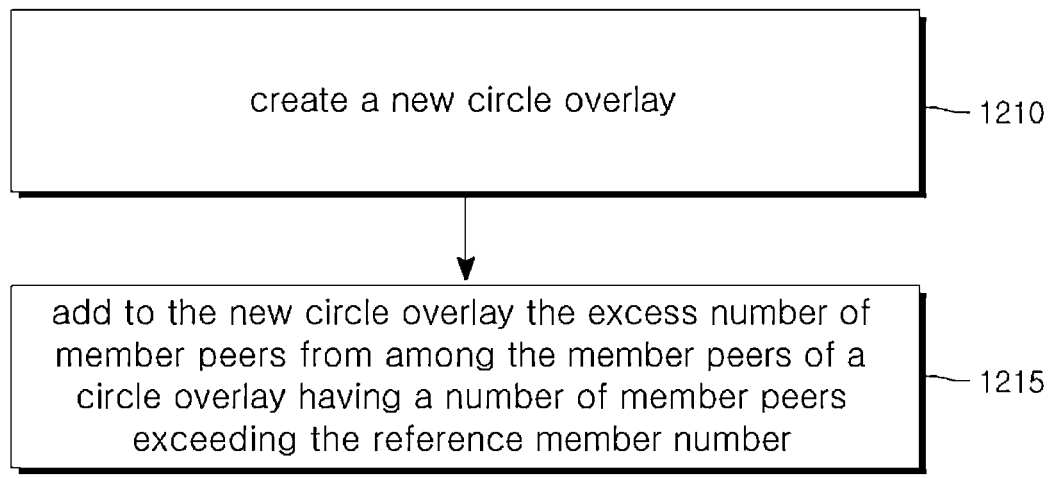
FIG. 12 is a flowchart illustrating a method of changing the circle-mesh overlay network after creating a new circle overlay due to the participation in the circle-mesh overlay network of a new participating peer according to an embodiment of the invention.

FIG. 12 is a flowchart illustrating a method of changing the circle-mesh overlay network after creating a new circle overlay due to the participation in the circle-mesh overlay network of a new participating peer according to an embodiment of the invention.

In step 1210, the overlay control apparatus 200 may create a new circle overlay in correspondence to the participation of the new participating peer.

Then, in step 1215, the overlay control apparatus 200 may move the excess member peers that exceed the reference member number in other circle overlays and add them as member peers to the new circle overlay. The method of determining positions in correspondence to the movement of the member peers to the new circle overlay is substantially the same as that described with reference to FIG. 11, and as such, redundant explanations are omitted.

The method of moving members from a different circle overlay that exceeds the reference member number to a new circle overlay is described below in more detail with reference to FIG. 13.

Figure 13:
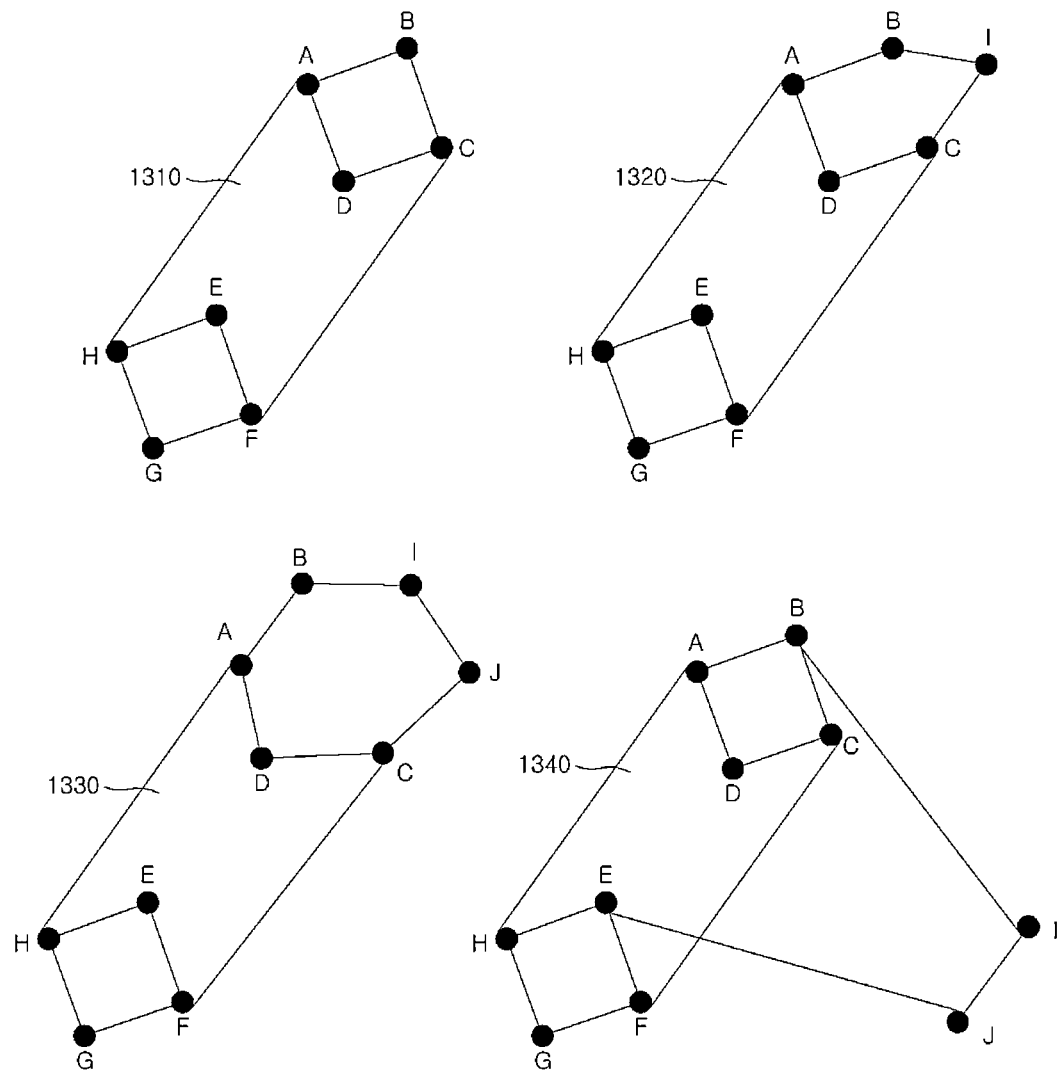
FIG. 13 is a diagram illustrating a method by which a new participating peer may participate in the circle-mesh overlay network according to an embodiment of the invention.

FIG. 13 is a diagram illustrating a method by which a new participating peer may participate in the circle-mesh overlay network according to an embodiment of the invention.

As illustrated by 1310 in FIG. 13, suppose a first circle overlay includes member peer A, member peer B, member peer C, and member peer D; and a second circle overlay includes member peer E, member peer F, member peer G, and member peer H. Also, suppose that the first circle overlay and the second overlay are overlapped to form an overlay network by way of the interconnections between member peer A and member peer H and between member peer C and member peer F. While in this state, if a new participating peer I requests participation in the circle-mesh overlay network, there are not enough member peers to create a new circle overlay, and as such, the new member peer I can be positioned between member peer B and member peer C, which are at the smallest physical distances, to be added to the first circle overlay, as illustrated by 1320 in FIG. 13.

While in this state, suppose a new participating peer J requests participation in and is added to the circle-mesh overlay network as illustrated by 1330 in FIG. 13. Due to the participation of the new participating peer J in the circle-mesh overlay network, the condition is met for creating a new circle overlay, and therefore, a new circle overlay can be created, and two member peers that are in excess of the reference member number in the first circle overlay can be selected, moved, and added to the new circle overlay. To be more specific, it can be seen that the sets of two member peers in the first circle overlay that form edges which are not interconnected with different circle overlays are member peers BI and member peers IJ. The overlay control apparatus 200 may select as candidate member peers the two member peers of the edge of which the physical distance is the smallest, from among edges formed by member peers that are not interconnected with other circle overlays. For easier understanding and explanation, it is assumed that the edge of member peers BI has a smaller physical distance than the edge of member peers IJ. In this case, the overlay control apparatus 200 may select member peer B and member peer I as candidate peers, which have the smaller physical distance of the edge between member peers.

Then, the overlay control apparatus 200 may determine final movement member peers, as the member peers with which the physical distance of the edge connecting the member peers of the new circle overlay would be the smallest in the case that member peer B and member peer I are moved and added to the new circle overlay. Here, the method of determining the positions in the new circle overlay according to the movement of member peer B and member peer I is substantially the same as that described with reference to FIG. 11. For each case of moving member peer B and member peer I to a particular position in the new circle overlay as described with reference to FIG. 11, suppose for example that the total physical distance of all of the edges (i.e. edges between the member peers) is 220 when member peer B is moved and added, and that the total physical distance of all of the edges is 210 when member peer I is moved and added.

As the total physical distance of the edges between the member peers is the smallest when member peer I is moved to the new circle overlay, the overlay control apparatus 200 can determine member peer I as the final movement member peer and can move it to the new circle overlay.

In this way, the overlay control apparatus 200 can move to a new circle overlay those member peers that correspond to the excess number of members in a circle overlay exceeding the reference member number and then form interconnections with other circle overlays.

That is, the overlay control apparatus 200 can form a circle-mesh overlay network 1340 by selecting the member peer that has the smallest physical distance from the new circle overlay, from among the first overlay and the second overlay, and interconnecting the member peer and its coupled member peer with the member peers of the new circle overlay to overlap the overlays.

Figure 14:
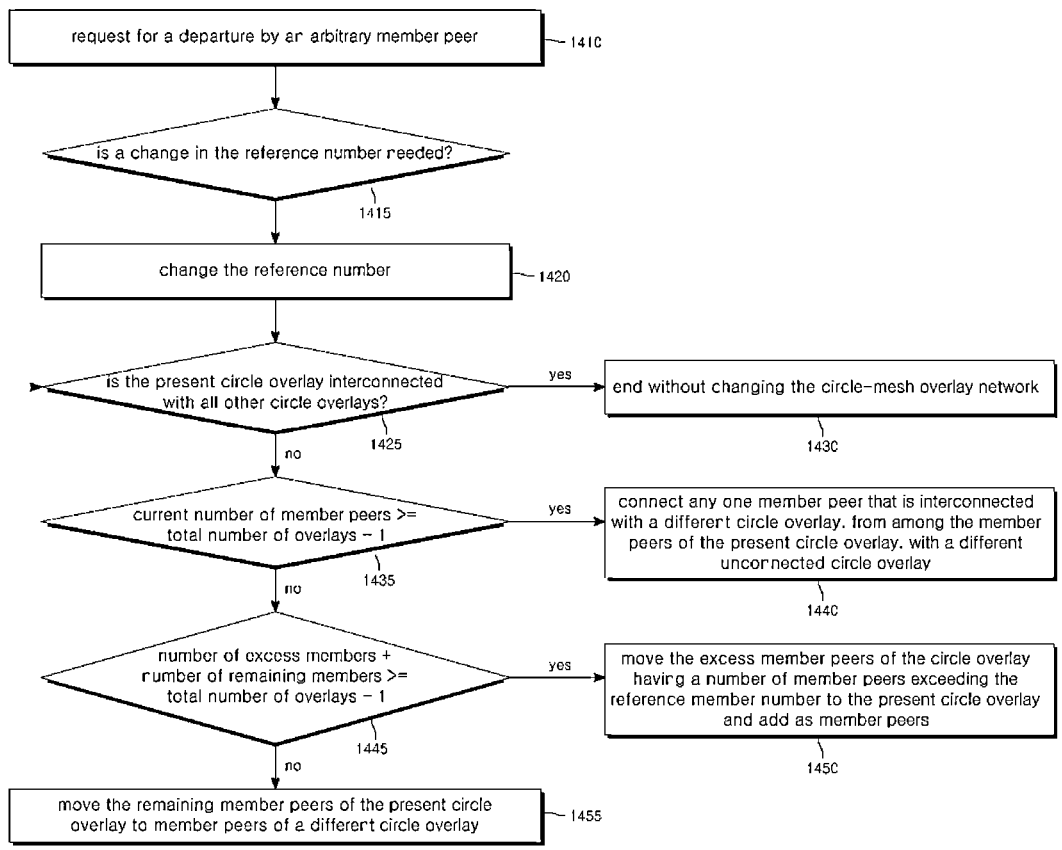
FIG. 14 is a flowchart illustrating a method of changing the circle-mesh overlay network when an arbitrary member peer departs the overlay according to an embodiment of the invention.
Figure 15:
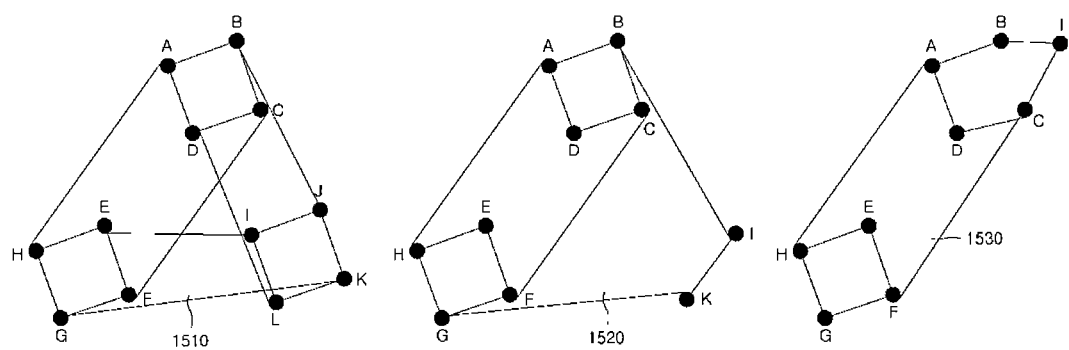
FIG. 15 is a diagram illustrating a method of changing the circle-mesh overlay network when an arbitrary member peer departs the overlay according to an embodiment of the invention.

FIG. 14 is a flowchart illustrating a method of changing the circle-mesh overlay network when an arbitrary member peer departs the overlay according to an embodiment of the invention, and FIG. 15 is a diagram illustrating a method of changing the circle-mesh overlay network when an arbitrary member peer departs the overlay according to an embodiment of the invention.

In step 1410, the overlay control apparatus 200 may receive a departure request from an arbitrary member peer. For easier understanding and explanation, the circle overlay from which a member peer has requested departure will be referred to as the present circle overlay.

In step 1415, the overlay control apparatus 200 may determine whether or not it is needed to change the reference member number of the present circle overlay, in correspondence to the departure request by the arbitrary member peer.

For example, the overlay control apparatus 200 can determine that a change in the reference member number of the present circle overlay is needed if the condition shown below is met.

$$\left(\frac{(N-2)}{2}+1\right) \times (N-2) \geq (M-1) \text{ or } N \geq 4 \qquad \text{[Equation 4]}$$

Here, N represents the reference member number of the present circle overlay, and M represents the total number of participating peers.

If a change is needed for the reference member number of the present circle overlay, then in step 1420, the overlay control apparatus 200 may change the reference member number of the present circle overlay.

Then, in step 1425, the overlay control apparatus 200 may determine whether or not the present circle overlay is interconnected with all other circle overlays, in correspondence to the departure by an arbitrary member peer.

If the present circle overlay is interconnected with all other circle overlays, then in step 1430, the overlay control apparatus 200 may decide that the circle-mesh overlay network is currently operating well and may finish without making a particular change to the circle-mesh overlay network.

However, if the present circle overlay is not interconnected with all other circle overlays, then in step 1435, the overlay control apparatus 200 may determine whether or not the number of member peers of the present circle overlay is greater than or equal to the total number of circle overlays excluding itself.

If the number of member peers of the present circle overlay is greater than or equal to the number of all circle overlays excluding itself, then in step 1440, the overlay control apparatus 200 may connect one of the member peers that are interconnected with other circle overlays, from among the member peers of the present circle overlay, with another circle overlay that is not connected.

For example, in FIG. 15, the circle overlay including member peer A, member peer B, member peer C, and member peer D will be referred to as a first circle overlay; the circle overlay including member peer E, member peer F, member peer G, and member peer H will be referred to as a second circle overlay; and the circle overlay including member peer I, member peer J, member peer K, and member peer L will be referred to as a third circle overlay. Now, suppose that member peer J and member peer L in the third circle overlay request departure. Since the third circle overlay includes enough member peers for connecting to the other circle overlays even if member peer J and member peer L were to depart, the overlay control apparatus 200 may set a connection between either one of member peer I and member peer K, which are connected to the second circle overlay, and the first circle overlay.

For example, from among the member peers remaining in the third circle overlay, i.e. member peer I and member peer K, the overlay control apparatus 200 may connect member peer I with the first circle overlay, as it has the smallest physical distance from the first circle overlay. Of course, member peer I of the third circle overlay can be connected with the member peer having the smallest physical distance from among the member peers of the first circle overlay that are not participating in an interconnection with a different circle overlay (member peer B and member peer D).

However, if the number of member peers of the present circle overlay is smaller than the total number of circle overlays excluding itself, then in step 1445, the overlay control apparatus 200 may determine whether or not the sum of the number of excess members in the circle overlays exceeding the reference member number and the number of remaining members in the present circle overlay is greater than or equal to the total number of circle overlays excluding the present circle overlay.

If the sum of the number of excess members in the circle overlays exceeding the reference member number and the number of remaining members in the present circle overlay is greater than or equal to the total number of circle overlays excluding the present circle overlay, then in step 1450, the overlay control apparatus 200 may move the excess member peers to the present circle overlay and add them as member peers, in accordance to the number of excess members of the circle overlays exceeding the reference member number.

If the sum of the number of excess members in the circle overlays exceeding the reference member number and the number of remaining members in the present circle overlay is smaller than the total number of circle overlays excluding the present circle overlay, then in step 1455, the overlay control apparatus 200 may add the remaining member peers of the present circle overlay and add them as member peers to other circle overlays.

Referring again to FIG. 15, suppose that while in the state illustrated by 1520 in FIG. 15, member peer K from among the member peers of the third circle overlay departs the network. In this case, since the third circle overlay does not have enough member peers to form interconnections with the other circle overlays, the remaining member, i.e. member peer I, may be moved to either the first circle overlay or the second circle overlay. The method of adding member peer I to a different circle overlay is substantially the same as already described above, and the method of determining the position of member peer I is also substantially the same as described above with reference to FIG. 11. As such, redundant explanations are omitted.

The method of constructing and maintaining a circle-mesh overlay network according to an embodiment of the present invention can be implemented in the form of program instructions that may be performed using various computer means and can be recorded in a computer-readable medium. Such a computer-readable medium can include program instructions, data files, data structures, etc., alone or in combination.

The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains.

What is claimed is:

1. A method of constructing a circle-mesh overlay network by an overlay control apparatus, the method comprising:

(a) determining, by the overlay control apparatus, a reference member number of a circle overlay by using a total number of participating peers;
(b) creating, by the overlay control apparatus, a new circle overlay and adding member peers from among the participating peers to the new circle overlay in consideration of the reference member number; and
(c) forming, by the overlay control apparatus, a circle-mesh overlay network by way of interconnection between the new circle overlay and a different circle overlay,
wherein said step (c) comprises:
   setting a coupling between each member peer and a member peer positioned at an opposite position for each member peer of the new circle overlay;
   setting a coupling between each member peer and a member peer positioned at an opposite position for each member peer of the different circle overlay;
   interconnecting a member peer of the new circle overlay with a member peer of the different circle overlay having a smallest physical distance; and
   interconnecting a coupled member peer of the new circle overlay of the interconnected member peer with a coupled member peer of the different circle overlay.

2. The method of claim 1, wherein the reference member number is determined as a minimum even number satisfying an equation shown below:

$$N \times \left(\frac{N}{2} + 1\right) \geq M$$

wherein N is the reference member number and M is the total number of participating peers.

3. The method of claim 1, wherein said step (b) comprises:
   selecting a participating peer having a smallest physical distance from a member peer of the new circle overlay and adding the selected participating peer to the new circle overlay,
   wherein the selected participating peer is added as a member peer to the new circle overlay such that a number of member peers of the new circle overlay is smaller than or equal to the reference member number.

4. The method of claim 1, wherein said step (b) comprises:
   additionally creating the new circle overlay to repeat said step (b), if a number of participating peers remaining for participation in the overlay exceeds the reference member number.

5. The method of claim 1, wherein said step (c) comprises:
   selecting a member peer that is not interconnected with the different circle overlay from among member peers of the new circle overlay, if a number of member peers of the new circle overlay is not sufficient for interconnecting with the different circle overlay;
   selecting as a connection candidate peer a member peer of the different circle overlay having a smallest physical distance from the selected member peer and not participating in an interconnection to the different circle overlay; and
   connecting the selected member peer with the connection candidate peer.

6. A method of maintaining a circle-mesh overlay network by an overlay control apparatus when a new participating peer participates in the circle-mesh overlay network, the circle-mesh overlay network comprising a plurality of circle overlays comprising a plurality of member peers, the circle overlays being interconnected with one another, the method comprising:
   determining, by the overlay control apparatus, whether or not there exists a circle overlay having a number of members smaller than or equal to a reference member number, in correspondence to a participation request by the new participating peer;
   selecting, by the overlay control apparatus, a circle overlay having a smallest physical distance from the new participating peer from among circle overlays having a number of members smaller than or equal to the reference member number, if there does exist a circle overlay having a number of members smaller than or equal to the reference member number, and adding the new participating peer to the selected circle overlay;
   creating, by the overlay control apparatus, a new circle overlay, if a result of the determining is that there does not exist a circle overlay having a number of members smaller than or equal to the reference member number and if a number of excess members of a circle overlay having a number of members exceeding the reference member number is greater than or equal to a total number of circle overlays;
   adding, by the overlay control apparatus, the new participating peer to the new circle overlay and moving and adding excess member peers of the circle overlay having a number of members exceeding the reference member number to the new circle overlay; and
   forming, by the overlay control apparatus, interconnections between the new circle overlay and the plurality of circle overlays,
   wherein the selecting of the circle overlay having the smallest physical distance from the new participating peer and the adding of the new participating peer to the new circle overlay comprises:
      adding the new participating peer to the selected circle overlay, if there exists a member peer in the selected circle overlay that is not interconnected with a different circle overlay from among member peers included in the selected circle overlay, by positioning the new participating peer in a position opposite the member peer that is not interconnected with a different circle overlay;
      adding the new participating peer, if there does not exist a member peer that is interconnected with a different circle overlay from among member peers included in the selected circle overlay and if there exists a different circle overlay with which a single connection is formed with the selected circle overlay, by selecting a different circle overlay having a smallest physical distance from among different circle overlays and positioning the new participating peer in a position opposite a member peer of the selected circle overlay forming the single connection with the selected different circle overlay to add the new participating peer to the selected circle overlay; and
      adding the new participating peer to the selected circle overlay, if there does not exist a member peer that is interconnected with a different circle overlay from among member peers included in the selected circle overlay and if there does not exist a different circle overlay with which a single connection is formed with the selected circle overlay, by connecting the new participating peer with a member peer having a smallest physical distance with the new participating peer from among member peers of the selected circle overlay.

7. The method of claim 6, further comprising:

adding the new participating peer to a circle overlay having a smallest physical distance, if there does not exist a circle overlay having a number of members smaller than or equal to the reference member number and if the number of excess members of the circle overlay having a number of members exceeding the reference member number is smaller than the total number of circle overlays.

8. The method of claim 6, wherein the moving and adding of the excess member peers of the circle overlay having a number of members exceeding the reference member number to the new circle overlay comprises:

determining whether or not there exists a plurality of member peers that are not interconnected with a different circle overlay from among member peers of the circle overlay having a number of members exceeding the reference member number; and selecting two member peers having a smallest physical distance between edges as candidate member peers, if there exists a plurality of member peers that are not interconnected with a different circle overlay, and adding the selected candidate member peers to the new circle overlay.

9. The method of claim 8, wherein the moving of the candidate member peers to the new circle overlay comprises:

determining candidate member peers that when moved to the new circle overlay result in smallest physical distances between edges overall for member peers of the new circle overlay as final movement member peers, and moving the final movement member peers to the new circle overlay.

10. The method of claim 6, further comprising, before the determining of whether or not there exists a circle overlay having a number of members smaller than or equal to the reference member number:

renewing the reference member number in correspondence to the participation request by the new participating peer if a condition expressed by an inequality shown below is satisfied:

$$\left(\left(\frac{N}{2}\right)+1\right) \times N < (M+1)$$

wherein N is the reference member number and M is a number of participating members in the circle-mesh overlay network.

11. A method of maintaining a circle-mesh overlay network by an overlay control apparatus in correspondence to a departure by an arbitrary member peer, the circle-mesh overlay network comprising a plurality of circle overlays comprising a plurality of member peers, the circle overlays being interconnected with one another, the method comprising:

(a) determining, by the overlay control apparatus, whether or not a number of participating member peers of a present circle overlay from which a member peer has departed is greater than or equal to a total number of circle overlays excluding the present circle overlay, if the present circle overlay is not interconnected with all other circle overlays;

(b) checking, by the overlay control apparatus, a different circle overlay interconnected with the present circle overlay, if the number of participating member peers of the present circle overlay is greater than or equal to the total number of circle overlays excluding the present circle overlay;

(c) connecting, by the overlay control apparatus, any one of the member peers of the present circle overlay interconnected with the different circle overlay with a circle overlay that is not connected with the present circle overlay;

(d) determining, by the overlay control apparatus, whether moving excess member peers of a different circle overlay having a number of members a reference exceeding member number to the present circle overlay results in obtaining a sufficient number of member peers for interconnecting with all other circle overlays, if the number of participating member peers of the present circle overlay is smaller than the total number of circle overlays excluding the present circle overlay;

(e) moving and adding, by the overlay control apparatus, the excess member peers of the different circle overlay having a number of members exceeding the reference member number to the present circle overlay, if the sufficient number of member peers is obtained; and (f) forming, by the overlay control apparatus, interconnections between the present circle overlay and the other circle overlays.

12. The method of claim 11, wherein said step (c) comprises:

connecting any one of the member peers of the present circle overlay interconnected with the different circle overlay with a member peer of a circle overlay having a smallest physical distance that is not connected with the present circle overlay.

13. The method of claim 11, wherein the determining of whether the sufficient number of member peers is obtained comprises:

determining that the sufficient number of member peers is obtained if the equation shown below is satisfied:

(number of excess members+number of remaining members)≥total number of overlays−1 wherein the number of excess members is a number of members exceeding the reference member number in a circle overlay having a number of members exceeding the reference member number, and the number of remaining members is a number of member peers of the present circle overlay.

14. The method of claim 13, further comprising:

moving member peers of the present circle overlay to member peers of a different circle overlay, if a result of the determining is that a sufficient number of member peers is not obtained.

15. The method of claim 14, wherein the moving of the member peers of the present circle overlay to the member peers of the different circle overlay comprises:

selecting a circle overlay having a smallest physical distance from a member peer of the present circle overlay from among other circle overlays having a number of member peers smaller than or equal to the reference member number, if there exist one or more different circle overlays having a number of member peers smaller than or equal to the reference member number, and moving to the selected circle overlay.

16. The method of claim 14, further comprising, before said step (a):

renewing the reference member number if a condition expressed by an equation shown below is satisfied:

$$\left(\frac{(N-2)}{2}+1\right) \times (N-2) \geq (M-1) \text{ or } N \geq 4$$

wherein N is the reference member number, and M is a total number of peers participating in the circle-mesh overlay network.

* * * * *